US009570212B2

United States Patent
Sato et al.

(10) Patent No.: US 9,570,212 B2
(45) Date of Patent: Feb. 14, 2017

(54) WIRE HARNESS AND METHOD FOR MANUFACTURING WIRE HARNESS

(71) Applicant: SUMITOMO WIRING SYSTEMS, LTD., Mie (JP)

(72) Inventors: Takeshi Sato, Mie (JP); Isamu Hamamoto, Mie (JP); Tetsuya Sonoda, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 14/439,387

(22) PCT Filed: Aug. 9, 2013

(86) PCT No.: PCT/JP2013/071597
§ 371 (c)(1),
(2) Date: Apr. 29, 2015

(87) PCT Pub. No.: WO2014/077011
PCT Pub. Date: May 22, 2014

(65) Prior Publication Data
US 2015/0279514 A1    Oct. 1, 2015

(30) Foreign Application Priority Data

Nov. 15, 2012   (JP) ................................. 2012-251264

(51) Int. Cl.
*H01B 7/00* (2006.01)
*H01B 13/012* (2006.01)
(Continued)

(52) U.S. Cl.
CPC ......... *H01B 7/0045* (2013.01); *B60R 16/0207* (2013.01); *B60R 16/0215* (2013.01);
(Continued)

(58) Field of Classification Search
CPC ....................... H01B 7/0045; H01B 13/01209
(Continued)

(56) References Cited

U.S. PATENT DOCUMENTS

| 4,781,227 A   | * | 11/1988 | Cross   | ............... | H01B 13/01209 140/92.1 |
| 2010/0185107 A1 | * | 7/2010  | Grassl  | ...................... | H01B 7/04 600/509 |
| 2013/0098660 A1 | * | 4/2013  | Igarashi | ............... | H02G 3/0481 174/135 |

FOREIGN PATENT DOCUMENTS

| JP | 55093209   | * | 7/1980 |
| JP | 2011-160611 |   | 8/2011 |

(Continued)

OTHER PUBLICATIONS

Search report from PCT/JP2013/071597, mail date is Sep. 10, 2013.

*Primary Examiner* — Timothy Thompson
*Assistant Examiner* — Charles Pizzuto
(74) *Attorney, Agent, or Firm* — Greenblum & Bernstein, P.L.C.

(57) ABSTRACT

An object is to make it possible to hot-press a nonwoven member that covers a branching portion of a wire harness main body even when there is an error in the position of the branching portion. A wire harness includes a wire harness main body and a branching portion protection portion. The wire harness main body includes a trunk line portion and a branch line portion branching off from the trunk line portion. The branching portion protection portion is formed by hot-pressing a nonwoven member in a state in which the nonwoven member covers the branching portion where the branch line portion branches off from the trunk line portion. The branching portion protection portion includes a branch (Continued)

line side protection portion that is tapered from a base end side toward a distal end side of the branch line portion.

4 Claims, 4 Drawing Sheets

(51) Int. Cl.
*B60R 16/02* (2006.01)
*H02G 3/04* (2006.01)
*H02G 3/06* (2006.01)

(52) U.S. Cl.
CPC ..... *H01B 13/01209* (2013.01); *H02G 3/0481* (2013.01); *H02G 3/06* (2013.01)

(58) Field of Classification Search
USPC .................................. 174/72 A, 72 C; 156/52
See application file for complete search history.

(56) References Cited

FOREIGN PATENT DOCUMENTS

| | | | |
|---|---|---|---|
| JP | 2012-39782 | * | 2/2012 |
| JP | 2012-210043 | | 10/2012 |

* cited by examiner

WIRE HARNESS AND METHOD FOR MANUFACTURING WIRE HARNESS

TECHNICAL FIELD

The present invention relates to a technology for protecting a branching portion of a wire harness.

BACKGROUND ART

An example of a conventional technology for protecting a branching portion of a wire harness using a nonwoven member is disclosed in Patent Document 1.

In order to cover a branching portion with a nonwoven member having a shape that conforms to the branching shape, Patent Document 1 discloses a configuration in which a sheet-shaped nonwoven member having slits is wound around the branching portion and a configuration in which a band-shaped nonwoven member is wound around the branching portion. The nonwoven member that covers the branching portion is molded into a predetermined shape corresponding to the branching shape using a shaping mold.

CITATION LIST

Patent Documents

Patent Document 1: JP 2012-39782A

SUMMARY OF INVENTION

Technical Problem

Incidentally, a branching portion of a wire harness is temporarily bound with an adhesive tape or the like so as to keep a predetermined branching shape. However, there is a possibility that due to a positional error in manufacturing, the branching portion may be shifted from a predetermined designed position. Thus, when the nonwoven member that covers the branching portion is to be molded using a shaping mold in a state in which the wire harness is supported in a fixed position on a jig board or the like on which the wire harness is assembled, a situation may occur in which the temporarily bound branching portion and the shaping mold are misaligned, and the nonwoven member covering the branching portion cannot be set in the shaping mold.

Thus, an object of the present invention is to make it possible to hot-press a nonwoven member that covers a branching portion of a wire harness main body even when there is an error in the position of the branching portion.

Solution to Problem

To address the above-described problem, a wire harness according to a first aspect includes a wire harness main body including a trunk line portion and a branch line portion branching off from the trunk line portion, and a branching portion protection portion that is formed by hot-pressing a nonwoven member in a state in which the nonwoven member covers a branching portion where the branch line portion branches off from the trunk line portion, the branching portion protection portion including a branch line side protection portion that is tapered from a base end portion toward a distal end portion of the branch line portion. The branching portion protection portion is formed by hot-pressing the nonwoven member in a state in which the branching portion where the branch line portion branches off from the trunk line portion is sandwiched by the nonwoven member, said nonwoven member being a sheet-shaped nonwoven member, and the wire harness further includes a periphery protection portion that is formed by hot-pressing a nonwoven member in a state in which the nonwoven member covers at least one part of the trunk line portion and the branch line portion that is adjacent to the branching portion so as to cover that part, wherein hot-pressing is performed in a state in which the nonwoven member for forming the branching portion protection portion also overlaps the nonwoven member for forming the periphery protection portion.

A second aspect is the wire harness according to the first aspect, wherein the branch line side protection portion is formed into a shape that is flat along a plane containing the trunk line portion and the branch line portion.

A fifth aspect is the wire harness according to the first or second aspects, wherein the branch line portion branches off from the trunk line portion, which has a straight line shape.

A method for manufacturing a wire harness according to a sixth aspect includes (a) holding a wire harness main body including a trunk line portion and a branch line portion branching off from the trunk line portion using a wire harness holder, (b) covering a branching portion where the branch line portion branches off from the trunk line portion with a nonwoven member, (c) setting the nonwoven member covering the branching portion in a hot-pressing mold having a mold surface for forming a branch line side protection portion, the mold surface being tapered from a base end portion toward a distal end portion of the branch line portion, in a state in which the wire harness main body is held by the wire harness holder, and (d) hot-pressing the nonwoven member covering the branching portion using the hot-pressing mold.

Advantageous Effects of Invention

According to the first aspect, the branch line side protection portion has an increased width on the side of the base end portion, thereby providing a high degree of flexibility with respect to the position in which the base end portion of the branch line portion is disposed. Thus, even when there is an error in the position of the branching portion of the wire harness main body, the nonwoven member can be hot-pressed so as to cover that branching portion.

According to the second aspect, even when there is an error in the position of the branching portion with respect to a direction in which the trunk line portion extends, the nonwoven member can be hot-pressed so as to cover that branching portion.

According to the first aspect, the branching portion can be completely covered by the nonwoven member, and also the thickness of the nonwoven member covering the branching portion can be made uniform.

According to the first aspect, a form in which the branching portion protection portion and the periphery protection portion are continuous with each other can be easily obtained.

According to the fifth aspect, the branching portion where the branch line portion branches off from the straight line-shaped trunk line portion can be protected.

According to the sixth aspect, the hot-pressing mold has the mold surface for forming the branch line side protection portion, the mold surface being tapered from the base end portion toward the distal end portion of the branch line portion, thereby providing a high degree of flexibility with respect to the position in which the base end portion of the branch line portion is disposed. Thus, even when there is an error in the position of the branching portion of the wire harness main body, the nonwoven member can be set and hot-pressed in the hot-pressing mold so as to cover that branching portion.

DESCRIPTION OF EMBODIMENTS

Figure 1:
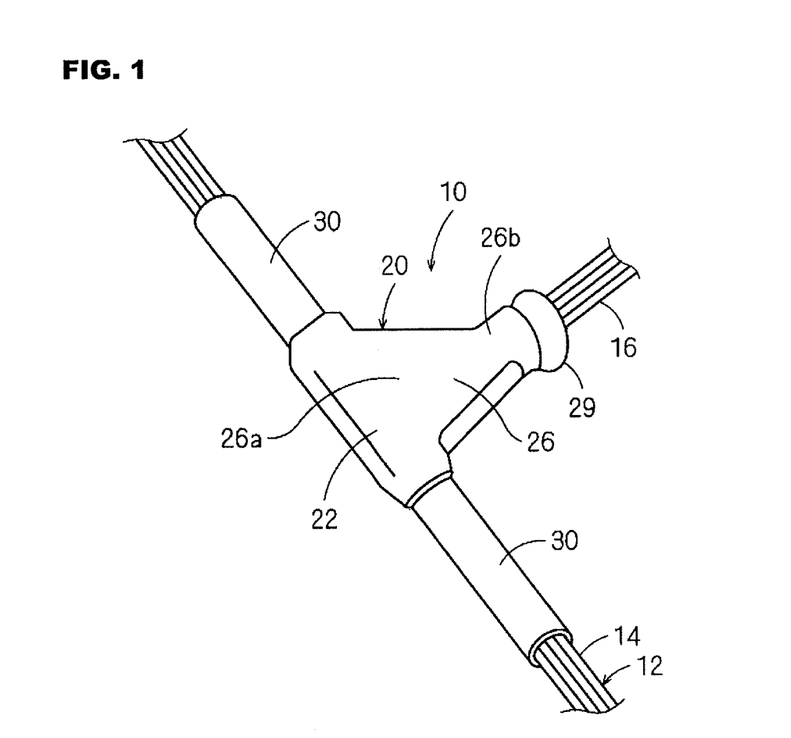
FIG. 1 is a schematic perspective view showing a wire harness according to an embodiment.
Figure 2:
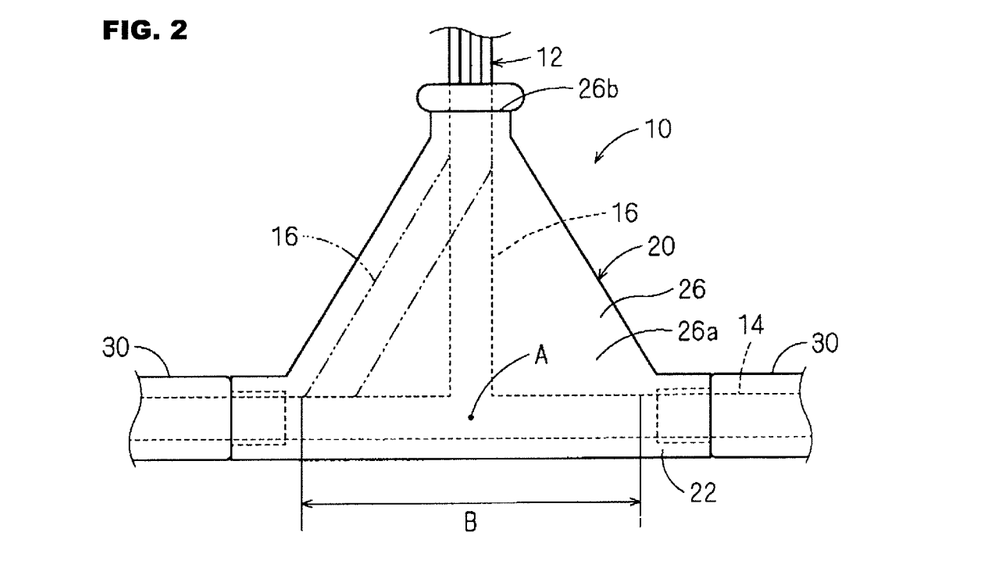
FIG. 2 is a schematic plan view showing the wire harness.

Hereinafter, a wire harness according to an embodiment will be described. FIG. 1 is a schematic perspective view showing a wire harness 10, and FIG. 2 is a schematic plan view showing the wire harness 10.

This wire harness 10 includes a wire harness main body 12, a branching portion protection portion 20, and periphery protection portions 30.

The wire harness main body 12 has a configuration in which a plurality of wires are bundled. More specifically, the wire harness main body 12 has a configuration in which a plurality of wires are bundled while branching in accordance with the form of wiring at a location in a vehicle or the like where the wires are to be installed. The wire harness main body 12 may include an optical fiber cable and the like. When installed at the installation location in the vehicle or the like, the wire harness main body 12 is used as wiring that electrically connects various types of electric equipment mounted in the vehicle or the like to one another.

An initial form of this wire harness main body 12, which is not yet protected by the branching portion protection portion 20, includes a trunk line portion 14 and a branch line portion 16 branching off from the trunk line portion 14 at an initial branching point A. That is to say, a plurality of wires are temporarily bound together using a binding member such as an adhesive tape or the like, so that the plurality of wires are bundled so as to constitute the trunk line portion 14, and a part of the plurality of wires branches off from the trunk line portion 14 at the initial branching point A, thereby forming the branch line portion 16. The branch line portion 16 may be constituted by a bundle of a plurality of wires or may be constituted by a single wire.

In the above-described wire harness main body 12, any two of three wire bundles diverging from the initial branching point A can be regarded as the trunk line portion 14, and the other one as the branch line portion 16. Usually, among the three wire bundles diverging from the initial branching point A, two wire bundles having a larger diameter or having a larger number of wires are selected as the trunk line portion 14, while a wire bundle having a smaller diameter is selected as the branch line portion 16.

The trunk line portion 14 has a straight line shape at least in those parts that extend from the initial branching point A. In the other parts of the trunk line portion 14, the trunk line portion 14 may be bent, and also a wire may branch off. Moreover, the trunk line portion 14 may be bent at the initial branching point A.

The branching portion protection portion 20 is formed by a nonwoven member being hot-pressed in a state in which the nonwoven member covers a branching portion where the branch line portion 16 branches off from the trunk line portion, and includes a trunk line side protection portion 22 that covers the trunk line portion 14 including the initial branching point A, and a branch line side protection portion 26 that covers a part of the branch line portion 16 that extends from a base end portion on the side of the initial branching point A toward a distal end portion. When covering the branching portion protection portion 20 with the nonwoven member, it is preferable to cover that portion in such a manner that the branching portion where the branch line portion 16 branches off from the trunk line portion is sandwiched by a sheet-shaped nonwoven member, as described later. In this manner, the branching portion where the branch line portion 16 branches off from the trunk line portion can be completely covered.

Here, a nonwoven material that hardens and can be interjoined through the application of heat and pressure may be used as the nonwoven member.

A nonwoven material containing entangled base fibers and an adhesive resin (also called "binder") can be used as the above-described nonwoven material. The adhesive resin is a resin having a lower melting point than the melting point of the base fibers. When the nonwoven material is heated to a processing temperature that is lower than the melting point of the base fibers and higher than the melting point of the adhesive resin, the adhesive resin is molten and penetrates between the base fibers. Then, when the nonwoven material cools to a temperature below the melting point of the adhesive resin, the adhesive resin solidifies in a state in which the adhesive resin bonds the base fibers to one another. Thus, the nonwoven material becomes harder than that before heating and is therefore maintained in the shape into which it is formed during heating. Moreover, the adhesive resin also penetrates through portions of the nonwoven member that come into contact with each other and solidifies there, thereby joining those contact portions of the nonwoven member to each other. Such a nonwoven material is also referred to as "nonwoven fabric".

The adhesive resin may be in granular form or may be in fiber form. It is also possible to compose binder fibers by forming an adhesive resin layer on an outer circumference of core fibers and allow these binder fibers to be entangled with the base fibers. The same materials as the above-described materials for the base fibers can be used for the core fibers in this case.

Any type of fibers that can keep the fibrous state at the melting point of the adhesive resin may be used as the base fibers, and various types of fibers including resin fibers can be used. Moreover, a thermoplastic resin fiber having a lower melting point than the melting point of the base fibers can be used as the adhesive resin. An example of the combination of the base fibers and the adhesive resin is a combination of a resin fiber of PET (polyethylene terephthalate), which is used as the base fibers, and a copolymer resin of PET and PEI (polyethylene isophthalate), which is used as the adhesive resin. In this case, the melting point of the base fibers is higher than the melting point of the adhesive resin. Thus, when the nonwoven material is heated to a temperature between those melting points, the adhesive resin is molten and penetrates between the base fibers, which are not molten and are keeping the fiber form. Then, when the nonwoven material cools to a temperature below the melting point of the adhesive resin, the adhesive resin solidifies in a state in which the adhesive resin bonds the base fibers to one another, so that the nonwoven material hardens and maintains the shape into which it is formed during heating. That is to say, when the nonwoven material is sandwiched between molds having mold surfaces for shaping, and pressure is applied to the molds in a heated state, the nonwoven material is molded into a predetermined shape corresponding to the mold surfaces, and after being cooled, the nonwoven material is maintained in that shape into which it is molded between the molds. Moreover, in mutual contact portions of the nonwoven member that come into contact with each other, the molten adhesive resin penetrates through the counterpart contact portions and then solidifies there. Thus, the mutual contact portions of the nonwoven member are joined to each other. The above-described processing method is called "hot-pressing". A more specific example of manufacturing of the above-described branching portion protection portion 20 will be described later.

The trunk line side protection portion 22 is formed into the shape of a tube that covers the trunk line portion 14 in close contact therewith. A part of trunk line side protection portion 22 other than those parts from which the branch line side protection portion 26 extends is formed into a cylindrical shape so as to conform to the outer shape of the trunk line portion 14. However, this part may also be formed into other shapes such as an elliptic cylindrical shape, an angular tube shape, and the like.

The length of the trunk line side protection portion 22 is not particularly limited. However, as described later, with consideration given to a tolerance range that is allowable for an error of the initial branching point A in forming the branch line portion 16 that branches off from trunk line portion 14, it is preferable to set the length at a length enough to cover that tolerance range.

The branch line side protection portion 26 is formed into a shape that is tapered from the base end side toward the distal end side of the branch line portion 16.

Here, the branch line side protection portion 26 is formed into a shape that is flat along a plane containing the trunk line portion 14 and the branch line portion 16 and that is gradually narrowed from the base end side toward the distal end side of the branch line portion 16.

More specifically, the branch line side protection portion 26 is formed into the shape of a thick plate that has an isosceles trapezoidal shape in the plane containing the trunk line portion 14 and the branch line portion 16 and that extends along the plane containing the trunk line portion 14 and the branch line portion 16. A portion 26a of the branch line side protection portion 26 that corresponds to the lower base of the isosceles trapezoidal shape, which is the longer base, is disposed continuously with the trunk line portion 14, while a portion 26b corresponding to the upper base, which is the shorter base, protrudes in a direction away from the trunk line portion 14.

The above-described branch line portion 16 branches off from the trunk line portion 14 at any position along the portion 26a of the branch line side protection portion 26 that corresponds to the lower base, and is held within the branch line side protection portion 26. Moreover, in the portion 26b of the branch line side protection portion 26 that corresponds to the upper base, the branch line portion 16 is held so as to extend outward.

Note that here, a protective end portion 29 composed of a part of the nonwoven member that is not hot-pressed is provided to the outside of the branch line side protection portion 26. As described later, the protective end portion 29 has the function of preventing the hot-pressing mold from coming into direct contact with the branch line portion 16 during hot-pressing of the nonwoven member.

Moreover, the periphery protection portions 30 are each configured so as to cover a part of the trunk line portion 14 that is adjacent to the branching portion where the branch line portion 16 branches off. Here, the periphery protection portions 30 are configured so as to cover those parts of the trunk line portion 14 that are adjacent to and on opposite sides of the branching portion.

Similarly to the above-described branching portion protection portion 20, the periphery protection portions 30 are formed by hot-pressing nonwoven members in a state in which the nonwoven members respectively cover the above-described parts of the trunk line portion 14. The same materials as those described above can be used for these nonwoven members.

The periphery protection portions 30 are formed into tubular shapes so as to respectively cover the above-described parts of the trunk line portion 14 in close contact therewith. The periphery protection portions 30 are herein formed into cylindrical shapes, but may also be formed into elliptic cylindrical shapes, angular tube shapes, and the like.

Each periphery protection portion 30 may cover only a part of the trunk line portion 14 that is in the immediate vicinity of the portion where the branch line portion 16 branches off, or may be configured so as to cover a larger part of the trunk line portion 14 including a part farther away from the portion where the branch line portion 16 branches off. Also, each periphery protection portion 30 may be bent at an intermediate position thereof in accordance with a course along which the trunk line portion 14 is routed when installed in the vehicle.

As described later, those portions of the nonwoven member that form both end portions of the trunk line side protection portion 22 of the branching portion protection portion 20 are hot-pressed in a state in which those portions also overlap the respective nonwoven members for forming the periphery protection portions 30. Thus, in a complete form, both the end portions of the trunk line side protection portion 22 are joined to the respective end portions of the periphery protection portions 30 in an overlapping manner. Therefore, even at the boundaries between the branching portion protection portion 20 and the periphery protection portions 30, the trunk line portion 14 is continuously covered by the branching portion protection portion 20 and the periphery protection portions 30, so that the trunk line portion 14 is continuously protected, and also a predetermined course shape of the trunk line portion 14 is maintained.

With the thus configured wire harness 10, since the branching portion protection portion 20 has an increased width on the side of the base end portion, the branch line portion 16 can be relatively freely disposed within the increased-width part of the branching portion protection portion 20. This provides a high degree of flexibility with respect to the position in which the base end portion of the branch line portion 16 is disposed.

More specifically, since the branching portion protection portion 20 has an increased width in the portion 26a that corresponds to the lower base and is located on the side of the base end portion, the base end portion (initial branching point A) of the branch line portion 16 can be disposed and held in any position within a relatively wide range B in the portion 26a of the branching portion protection portion 20 that corresponds to the lower base.

Thus, it goes without saying that in the case in which the base end portion (initial branching point A) of the branch line portion 16 is disposed in a correct position (intermediate portion of the trunk line side protection portion 22 in a longitudinal direction thereof) as intended by the design, the trunk line portion 14 and the branch line portion 16 branching off from the trunk line portion 14 can be protected by the branching portion protection portion 20, and thereby the above-described branching shape can be maintained.

Moreover, even in the case in which the base end portion (initial branching point A) of the branch line portion 16 is disposed in a position that is shifted, within the above-described range B, from the correct position (intermediate portion of the trunk line side protection portion 22 in the longitudinal direction thereof) intended by the design (see branch line portion 16 indicated by the double dotted-dashed lines in FIG. 2) due to, for example, an error in the position at which the branch line portion 16 branches off from the trunk line portion 14, the trunk line portion 14 and the branch line portion 16 branching off from the trunk line portion 14 can be protected by the branching portion protection portion 20 while the branch line portion 16 is directed from the position close to one end portion of the trunk line side protection portion 22 toward the portion 26b of the branch line portion 16 that corresponds to the upper base, and thereby the above-described branching shape can be maintained. Note that even in this case, in the portion 26b of the branching portion protection portion 20 that corresponds to the upper base, the branch line portion 16 is directed outward in a state in which it is guided toward the center of the portion 26b corresponding to the upper base in a width direction thereof. Thus, with respect to the position from which the branch line portion 16 extends outward relative to the trunk line portion 14, the branch line portion 16 is directed outward from a more correct position as intended by the design in the longitudinal direction of the trunk line portion 14. Accordingly, irrespective of the position of the initial branching point A, the branch line portion 16 can be made to extend outward from a more correct position relative to the trunk line portion 14.

In the above-described manner, even when there is an error in the position of the branching portion of the wire harness main body 12, the nonwoven member can be hot-pressed so as to cover that branching portion.

In addition, since the branch line side protection portion 26 is formed into a shape that is flat along the plane containing the trunk line portion 14 and the branch line portion 16, when there is an error in the position of the branch line portion 16 with respect to the direction in which the trunk line portion 14 extends, the nonwoven member can be hot-pressed so as to cover the branching portion in such a manner that the positional error can be accommodated.

That is to say, usually, an error in the position of the base end portion of the branch line portion 16 occurs in the longitudinal direction of the trunk line portion 14. Therefore, forming the branch line side protection portion 26 into the above-described shape enables the branching portion protection portion 20 to be formed of the nonwoven member so as to accommodate the above-described positional error while having a relatively compact configuration. Moreover, since the base end portion of the branch line side protection portion 26 is also compressed in a thickness direction thereof, the strength that is required for protection can be easily achieved in that base end portion.

In addition, since the branching portion protection portion 20 is formed by hot-pressing the sheet-shaped nonwoven member in a state in which the portion where the branch line portion 16 branches off from the trunk line portion 14 is sandwiched by the nonwoven member, the branching portion can be completely covered by the nonwoven member, and also the thickness of the nonwoven member that covers the branching portion can be made uniform. This also makes it possible to, for example, make the wear resistance of an outer circumference of the branching portion protection portion 20 uniform.

That is to say, in such cases in which a narrow band-shaped nonwoven member is wound around the branching portion, a gap is likely to be formed between the turns of the narrow band-shaped nonwoven member that is wound around that portion. Moreover, depending on the degree of overlapping of the narrow band-shaped nonwoven member when wound around that portion, the thickness of the nonwoven member may not be uniform. When the portion where the branch line portion 16 branches off from the trunk line portion 14 is sandwiched by the sheet-shaped nonwoven member as described above, the gap is unlikely to be formed, and the thickness is also made uniform.

Note that the nonwoven member sandwiching the branching portion may be configured by two sheet-shaped nonwoven members, or may be configured by folding a single sheet-shaped nonwoven member in half, for example.

In addition, since the above-described wire harness 10 further includes the periphery protection portions 30 that are formed by hot-pressing the respective nonwoven members in a state in which the nonwoven members cover at least one part of the trunk line portion 14 that is adjacent to the branching portion so as to cover that part, and hot-pressing is performed in a state in which the nonwoven member for forming the branching portion protection portion 20 also overlaps the nonwoven members for forming the respective periphery protection portions 30, a form in which the branching portion protection portion 20 is continuous with the periphery protection portions 30 can be easily obtained. Accordingly, the trunk line portion 14 can be continuously protected, and the course thereof can be continuously regulated.

However, the periphery protection portions 30 are not absolutely necessary. Moreover, a configuration is also possible in which a periphery protection portion is provided on the branch line portion, and hot-pressing is performed in a state in which the nonwoven member for forming the branching portion protection portion also overlaps a nonwoven member for forming this periphery protection portion 30.

An example of a method for manufacturing the above-described wire harness 10 will be described.

Figure 3:
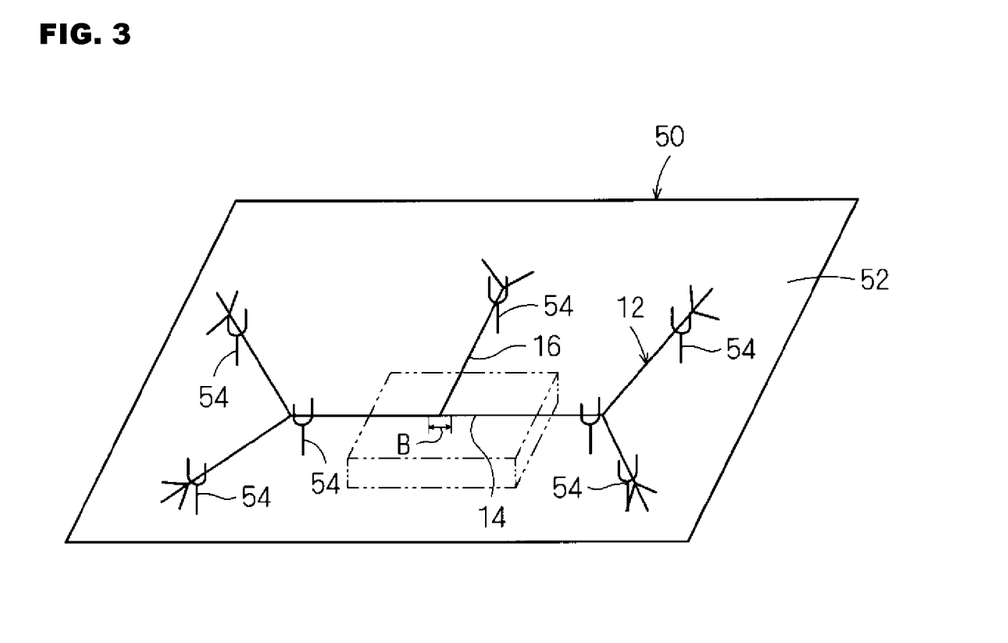
FIG. 3 is a schematic diagram showing a manufacturing support device for manufacturing the wire harness.

FIG. 3 is a schematic diagram showing a manufacturing support device 50 for manufacturing the wire harness 10. The manufacturing support device 50 includes a jig board 52 and wire harness holders 54 supported on the jig board 52. Preferably, the course and the like of the wire harness main body 12 to be manufactured are drawn on the jig board 52. Each wire harness holder 54 is configured so as to be capable of holding a part of the wire harness main body 12. For the wire harness holders 54, a configuration in which a U-shaped portion in which a part of the wire harness main body 12 can be held is formed or other configurations can be employed. The wire harness main body 12 can be held in a predetermined position on the jig board 52 by branching portions of the wire harness main body 12 that are different from the above-described branching portion being held by the wire harness holders 54.

A worker disposes a plurality of wires on the jig board 52, and performs operations including an operation for temporarily binding the wires between the wire harness holders 54, for example, using tapes while the plurality of wires are supported by the wire harness holders 54. As a result, the wire harness main body 12 including the trunk line portion 14 and the branch line portion 16 branching off from the trunk line portion 14 is held on the jig board 52 by the wire harness holders 54.

Note that a hot-pressing mold 60 is disposed at a location on the jig board 52 where a portion in which the branching portion protection portion 20 is to be formed is disposed. The hot-pressing mold 60 may be configured so as to be integrally incorporated in the jig board 52, or may be configured such that the jig board 52 has a hole through which the hot-pressing mold 60 is to be disposed, and the hot-pressing mold 60 is disposed at a predetermined position on the jig board 52 by moving the jig board 52 to a position corresponding to the hot-pressing mold 60. An example of the hot-pressing mold 60 will be described later.

Figure 4:
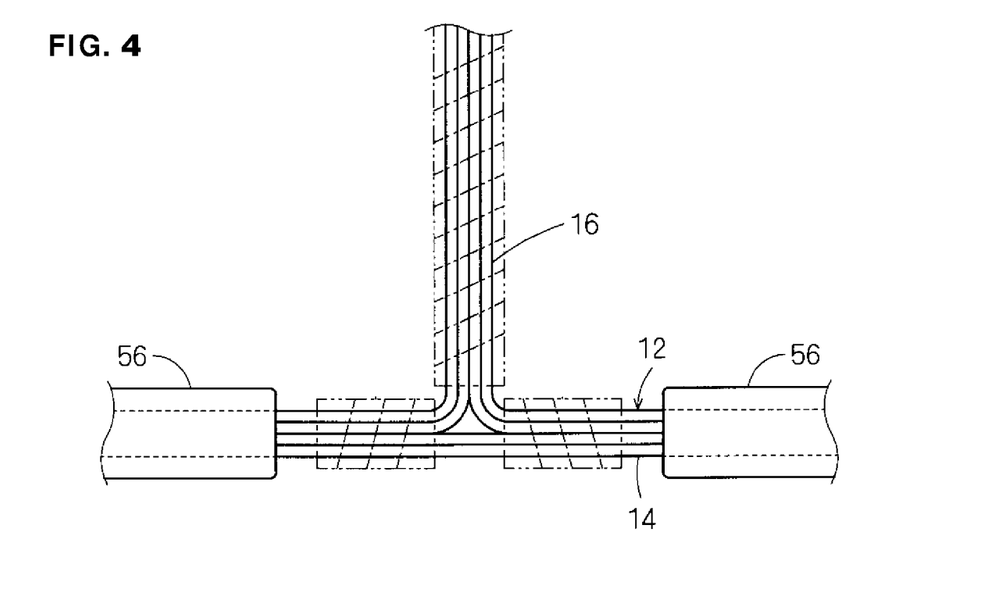
FIG. 4 is an explanatory diagram illustrating a step of manufacturing the wire harness.

Next, as shown in FIG. 4, sheet-shaped nonwoven members 56 are wound around two positions of the trunk line portion 14 that are located on opposite sides of the initial branching point A. A long band-shaped nonwoven member may also be helically wound around the trunk line portion 14.

Figure 5:
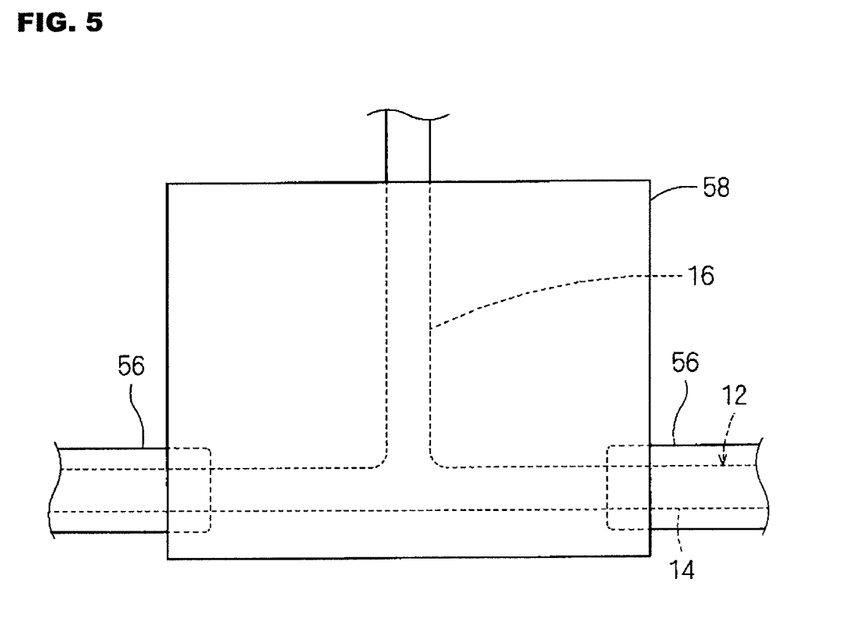
FIG. 5 is an explanatory diagram illustrating a step of manufacturing the wire harness.

Next, as shown in FIG. 5, the portion where the branch line portion 16 branches off from the trunk line portion 14 is covered with a sheet-shaped nonwoven member 58. For example, a single sheet-shaped nonwoven member 58 is folded in half, a fold line portion thereof is disposed on a part of the trunk line portion 14 that is located on the side opposite to the branch line portion 16, and then the trunk line portion 14 and a portion extending from the trunk line portion 14 to the branch line portion 16 are sandwiched by two square portions of the nonwoven member that individually extend from the fold line. At this time, the sheet-shaped nonwoven member 58 is positioned so as to overlap the nonwoven members 56 covering the trunk line portion 14.

Then, in a state in which the wire harness main body 12 is held by the wire harness holders 54, the nonwoven member 58 covering the branching portion and the nonwoven members 56 covering the trunk line portion 14 are set in the hot-pressing mold 60.

Figure 6:
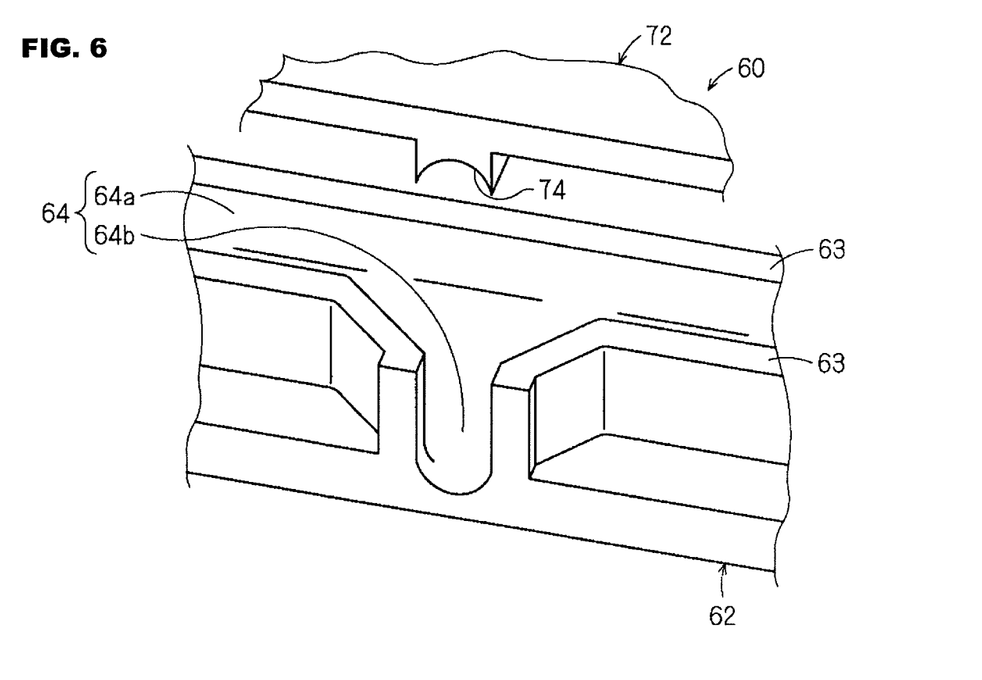
FIG. 6 is a schematic perspective view showing a hot-pressing mold.

FIG. 6 shows an example of the hot-pressing mold 60. The hot-pressing mold 60 includes a lower mold 62 and an upper mold 72.

The lower mold 62 is an elongated member formed of a metal or the like having excellent thermal conductivity, and a lower mold surface 64 is formed on one main surface (upper surface) thereof. Here, wall portions 63 corresponding to the outer shapes of the branching portion protection portion 20 and the periphery protection portions 30 when viewed from above are formed in the lower mold 62, and the lower mold surface 64 defining a groove for forming the branching portion protection portion 20 and the periphery protection portions 30, the groove being T-shaped when viewed from above, is formed by the wall portions 63. The lower mold surface 64 has a straight groove-shaped, lower-side periphery protection portion forming surface 64a for forming the periphery protection portions 30 and a lower-side branch line side protection portion forming surface 64b for forming the branch line side protection portion 26. The lower-side branch line side protection portion forming surface 64b is formed so as to be continuous with one side of the lower-side periphery protection portion forming surface 64a and is formed into a shape that is tapered (herein gradually narrowed) from the base end portion toward the distal end portion in accordance with the shape of the branch line side protection portion 26.

The upper mold 72 is an elongated member formed of a metal or the like having excellent thermal conductivity, and an upper mold surface 74 is formed on one main surface (lower surface) thereof. The upper mold surface 74 has the upper-side periphery protection portion forming surface that closes an upper portion of the lower-side periphery protection portion forming surface 64a, and an upper-side branch line side protection portion forming surface that closes an upper opening of the lower-side branch line side protection portion forming surface 64b. The lower-side periphery protection portion forming surface 64a and the upper-side periphery protection portion forming surface together form a periphery protection portion forming surface for making the outer shapes of the periphery protection portions 30, and the lower-side branch line side protection portion forming surface 64b and the upper-side branch line side protection portion forming surface together form a branch line side protection portion forming surface for making the outer shape of the branch line side protection portion 26.

Note that the lower mold 62 and the upper mold 72 are provided with a heater serving as a heating device. The heater heats the lower mold surface 64 and the upper mold surface 74 to a temperature that is lower than the melting point of the base fibers and higher than the melting point of the adhesive resin.

In addition, the upper mold 72 is disposed and supported so as to be capable of moving toward and away from the lower mold 62, and in a state in which the upper mold 72 is moved closest to the lower mold 62, the upper mold surface 74 is situated opposite the lower mold surface 64, and a T-shaped space is formed between the lower mold surface 64 and the upper mold surface 74. Applying heat and pressure to the nonwoven members 56 and 58 between the lower mold surface 64 and the upper mold surface 74 allows the nonwoven members 56 and 58 to be molded into the respective shapes described above, in accordance with the shapes of the lower mold surface 64 and the upper mold surface 74.

Figure 7:
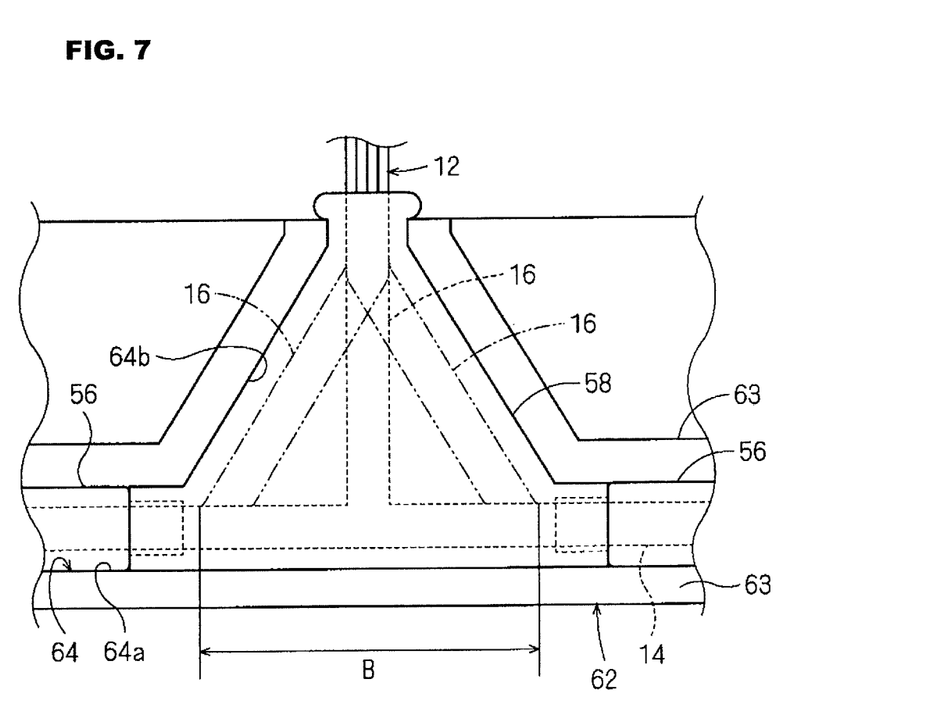
FIG. 7 is an explanatory diagram illustrating a step of manufacturing the wire harness.

As shown in FIG. 7, the nonwoven members 56 covering the trunk line portion 14 and the nonwoven member 58 covering the branching portion where the branch line portion 16 branches off from the trunk line portion 14 are disposed in the lower mold surface 64.

At this time, the wire harness main body 12 itself is held in a fixed position on the jig board 52 by the wire harness holders 54. At this time, when the initial branching point A at which the branch line portion 16 branches off from the trunk line portion 14 is correctly formed at a predetermined designed position, the initial branching point A can be disposed in an intermediate portion of the lower-side periphery protection portion forming surface 64a in the longitudinal direction thereof (see branch line portion 16 indicated by the dotted lines in FIG. 7). On the other hand, if the initial branching point A at which the branch line portion 16 branches off from the trunk line portion 14 is shifted from the predetermined designed position, the initial branching point A cannot be disposed in the intermediate portion of the lower-side periphery protection portion forming surface 64a in the longitudinal direction thereof. However, since the lower-side branch line side protection portion forming surface 64b is formed such that the width thereof increases toward the lower-side periphery protection portion forming surface 64a, even when the initial branching point A is shifted toward either end portion of the lower-side periphery protection portion forming surface 64a in the longitudinal direction of the trunk line portion 14 within the tolerance range B, the nonwoven members 56 and 58 can be set in the lower mold surface 64 with the branch line portion 16 being directed from the position that is shifted toward one of the end portions of the lower-side periphery protection portion forming surface 64a toward the distal end portion of the lower-side branch line side protection portion forming surface 64b.

Note that the nonwoven member 58 is set so as to protrude from the lower-side branch line protection portion forming surface 64b on the side away from the trunk line portion 14. The protruding portion forms the protective end portion 29.

Note that the nonwoven member 58 may be preliminarily cut into a shape that is gradually narrowed toward an end that is away from the trunk line portion 14, in accordance with the shape of the lower-side periphery protection portion forming surface 64a.

After that, the lower mold 62 and the upper mold 74 in a heated state are brought close to each other, and pressure is applied across the two molds. Then, heat and pressure are applied to the nonwoven members 56 and 58 between the lower mold surface 64 and the upper mold surface 74. Thus, the nonwoven members 56 and 58 are molded into the respective shapes of the periphery protection portions 30 and the branching portion protection portion 20. Also, those parts of the branching portion protection portion 20 that cover the respective periphery protection portions 30 are joined to the periphery protection portions 30.

After that, the lower mold 62 and the upper mold 72 are brought away from each other, and the molded branching portion protection portion 20 and periphery protection portions 30 are removed from between the two molds. Thus, the wire harness 10 is obtained. Cooling after the application of heat and pressure may be performed in a state in which those protection portions are present between the lower mold 62 and the upper mold 72, or may be performed in a state in which those protection portions have been removed from between the two molds.

Note that in the foregoing embodiment, the branch line side protection portion 26 are formed into a flat shape that is gradually narrowed toward the distal end side; however, the branch line side protection portion is not necessarily required to have such a shape. For example, the branch line side protection portion may have a truncated cone shape, a truncated polygonal pyramid shape, or the like. In short, it is only required that the branch line side protection portion is shaped such that at least a part thereof is tapered toward the distal end side. Moreover, the branch line side protection portion may also have a shape that is tapered while being curved or stepped toward the distal end side.

Although the foregoing embodiment has been described using an example in which a single branch line portion 16 branches off from the trunk line portion 14, another branch line portion may also branch off from the same position.

Note that the configurations that have been described in the foregoing embodiment and variations can be combined as appropriate unless being inconsistent with one another.

Although the present invention has been described in detail above, the foregoing description is to be considered in all respects as illustrative, and the present invention is not limited to the foregoing description. It should be understood that innumerable variations that are not described herein can be envisaged without departing from the scope of the present invention.

REFERENCE SIGNS LIST

10 Wire harness
12 Wire harness main body
14 Trunk line portion
16 Branch line portion
20 Branching portion protection portion
22 Trunk line side protection portion
26 Branch line side protection portion
30 Periphery protection portion
54 Wire harness holder
56, 58 Nonwoven member
60 Hot-pressing mold

The invention claimed is:

1. A wire harness comprising:
a wire harness main body including a trunk line portion and a branch line portion branching off from the trunk line portion; and
a branching portion protection portion that is formed by hot-pressing a nonwoven member in a condition in which the nonwoven member covers a branching portion where the branch line portion branches off from the trunk line portion, the branching portion protection portion including a branch line side protection portion that is tapered from a base end portion toward a distal end portion of the branch line portion,
wherein the branching portion protection portion is formed by hot-pressing the nonwoven member in a condition in which the branching portion where the branch line portion branches off from the trunk line portion is sandwiched by the nonwoven member, said nonwoven member being a sheet-shaped nonwoven member, and
the wire harness further comprising:
a periphery protection portion that is formed by hot-pressing a nonwoven member in a condition in which the nonwoven member covers at least one part of the trunk line portion and the branch line portion that is adjacent to the branching portion so as to cover that part,
wherein hot-pressing is performed in a condition in which the nonwoven member for forming the branching portion protection portion also overlaps the nonwoven member for forming the periphery protection portion.

2. The wire harness according to claim 1,
wherein the branch line side protection portion is formed into a shape that is flat along a plane containing the trunk line portion and the branch line portion.

3. The wire harness according to claim 1,
wherein the branch line portion branches off from the trunk line portion, which has a straight line shape.

4. A method for manufacturing a wire harness, comprising:
(a) holding a wire harness main body including a trunk line portion and a branch line portion branching off from the trunk line portion using a wire harness holder;
(b) covering a branching portion where the branch line portion branches off from the trunk line portion with a nonwoven member;
(c) setting the nonwoven member covering the branching portion in a hot-pressing mold having a mold surface configured for forming a branch line side protection portion, the mold surface being tapered from a base end portion toward a distal end portion of the branch line portion, in a condition in which the wire harness main body is held by the wire harness holder; and (d) hot-pressing the nonwoven member covering the branching portion using the hot-pressing mold.

* * * * *